(12) United States Patent
Tewksbary et al.

(10) Patent No.: US 8,990,175 B2
(45) Date of Patent: Mar. 24, 2015

(54) RELATED DATA DEPENDENCIES

(75) Inventors: David Edward Tewksbary, Bolton, MA (US); Clark David Milliken, Harvard, MA (US)

(73) Assignee: Dassault Systemes Americas Corp., Waltham, MA (US)

(*) Notice: Subject to any disclaimer, the term of this patent is extended or adjusted under 35 U.S.C. 154(b) by 174 days.

(21) Appl. No.: 13/367,785

(22) Filed: Feb. 7, 2012

(65) Prior Publication Data

US 2013/0204853 A1 Aug. 8, 2013

(51) Int. Cl.
*G06F 17/30* (2006.01)

(52) U.S. Cl.
CPC .... *G06F 17/30595* (2013.01); *G06F 17/30336* (2013.01)
USPC .......................................................... 707/696

(58) Field of Classification Search
CPC .......... G06F 17/3056; G06F 17/30312; G06F 17/30336
See application file for complete search history.

(56) References Cited

U.S. PATENT DOCUMENTS

| | | | |
|---|---|---|---|
| 5,933,820 A | 8/1999 | Beier et al. | |
| 6,490,597 B1* | 12/2002 | Singh et al. | 707/999.202 |
| 6,714,943 B1 | 3/2004 | Ganesh et al. | |
| 6,728,719 B1 | 4/2004 | Ganesh et al. | |
| 7,076,493 B2* | 7/2006 | Myers et al. | 707/749 |
| 7,680,818 B1* | 3/2010 | Fan et al. | 707/999.103 |
| 7,801,882 B2 | 9/2010 | Cunningham et al. | |
| 8,346,788 B1* | 1/2013 | Kim et al. | 707/756 |
| 2002/0087734 A1* | 7/2002 | Marshall et al. | 709/310 |
| 2009/0222407 A1 | 9/2009 | Takuma et al. | |
| 2010/0153397 A1* | 6/2010 | Barabas et al. | 707/737 |

* cited by examiner

*Primary Examiner* — Yuk Ting Choi
(74) *Attorney, Agent, or Firm* — Hamilton, Brook, Smith & Reynolds, P.C.

(57) ABSTRACT

A computer-implemented method for use in maintaining currency of a projection index of a plurality of database objects. The computer-implemented method includes creating the projection index representative of a connection between a first database object and at least a second database object, determining an entity dependency between the first database object and at least the second database object, determining a path dependency between the first database object and at least the second database object, and updating the projection index in response to a modification of one or both of the entity dependency and the path dependency.

27 Claims, 7 Drawing Sheets

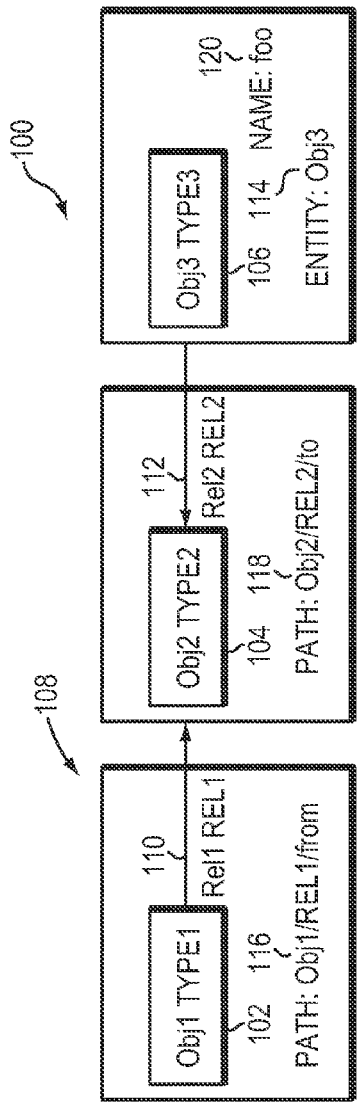
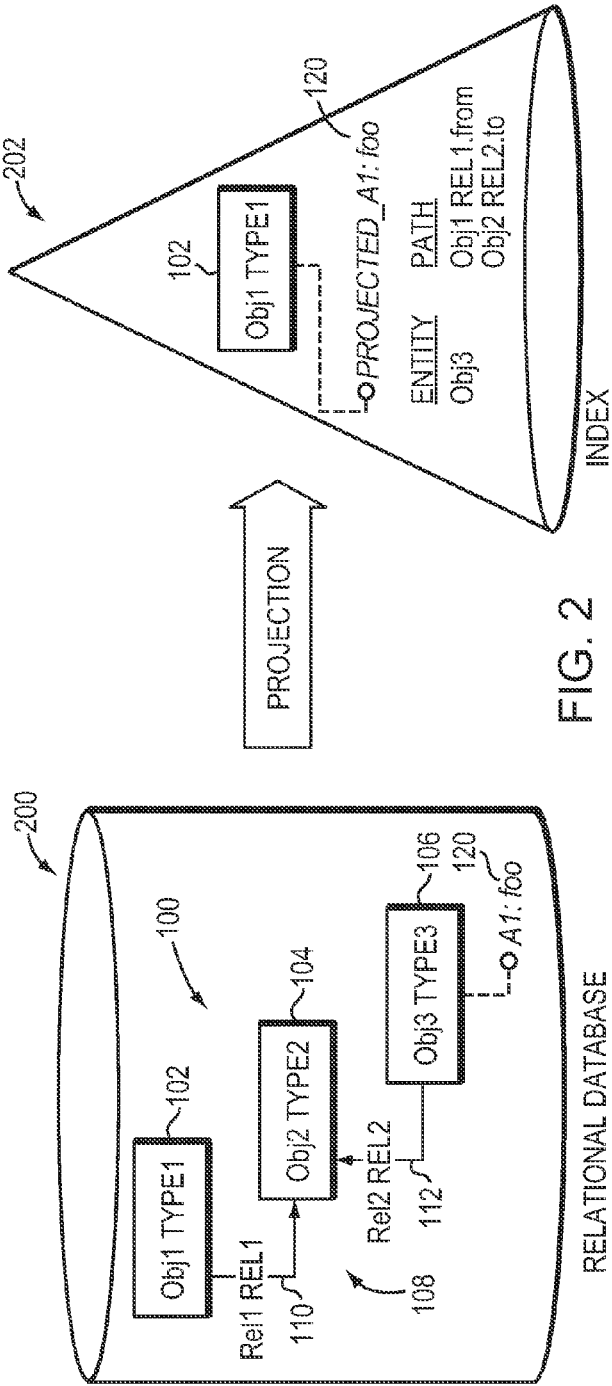
FIG. 1
FIG. 2

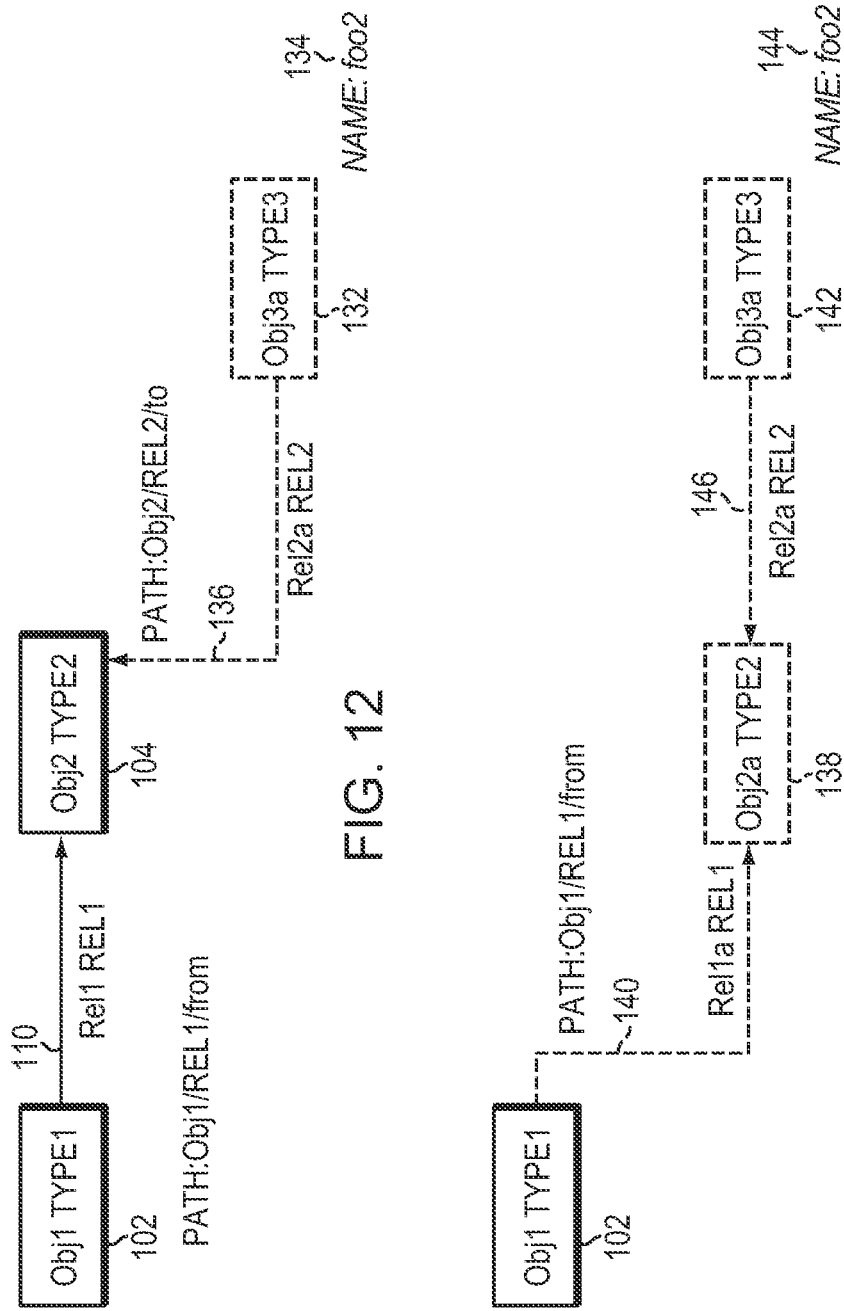

RELATED DATA DEPENDENCIES

BACKGROUND OF THE INVENTION

The embodiments described herein relate generally to database technology and, more particularly, to indexing technologies and methodologies.

At least some known applications based on a relational database provide modeling capabilities that enable database objects to be connected to other database objects through one or more relationships. More specifically, such applications enable one to describe database objects by type and according to what type of relationships connect the database objects. Moreover, some such applications enable searches against normalized data. However, normalized data searches generally require excessive processor and/or memory utilization. Other applications enable searches to be performed based on indices. However, these indices frequently become outdated because of additions, modifications, and/or deletions of nodes and/or nodal relationships within the database.

BRIEF DESCRIPTION OF THE INVENTION

In one aspect, a computer-implemented method is provided for use in maintaining currency of a projection index of a plurality of database objects. The computer-implemented method includes creating the projection index representative of a connection between a first database object and at least a second database object, determining an entity dependency between the first database object and at least the second database object, determining a path dependency between the first database object and at least the second database object, and updating the projection index in response to a modification of one or both of the entity dependency and the path dependency.

In another aspect, a computer system includes a memory area configured to store a plurality of database objects including at least a first database object and a second database object connected by an entity dependency and a path dependency. The memory area also stores a projection index of the database objects such that a relationship between the first database object and at least the second database object is stored in association with the first database object. The computer system also includes a processor operatively coupled to the memory area. The processor is configured to determine an entity dependency between the first database object and at least the second database object, determine a path dependency between the first database object and at least the second database object, and update the projection index in response to a modification of one or both of the entity dependency and the path dependency.

In another aspect, a computer program product is provided for use in maintaining currency of a projection index of a plurality of database objects, and includes one or more computer-readable storage media having computer-executable components. The components include an indexing component that when executed by a processor causes the processor to store in a memory area the database objects including at least a first database object and a second database object connected by an entity dependency and a path dependency, and store in the memory area a projection index of the database objects such that a relationship between the first database object and at least the second database object is stored in association with the first database object. The components also include an entity dependency component that when executed by a processor causes the processor to determine an entity dependency between the first database object and at least the second database object, and a path dependency component that when executed by a processor causes the processor to determine a path dependency between the first database object and at least the second database object. The indexing component also causes the processor to update the projection index and the first database object in response to a modification of one or both of the entity dependency and the path dependency.

BRIEF DESCRIPTION OF THE DRAWINGS

The details of one or more embodiments of the invention are set forth in the accompanying drawings and the description that follows. Other features, objects, and advantages of the invention will be apparent from the description and drawings, and from the claims.

FIG. 1 is a simple block diagram that illustrates entity dependency and path dependency between two database objects.

FIG. 2 illustrates how a relational database can be flattened using projection.

FIGS. 6-13 are block diagrams illustrating various use cases of the embodiments described herein.

DETAILED DESCRIPTION OF THE INVENTION

Figure 3:
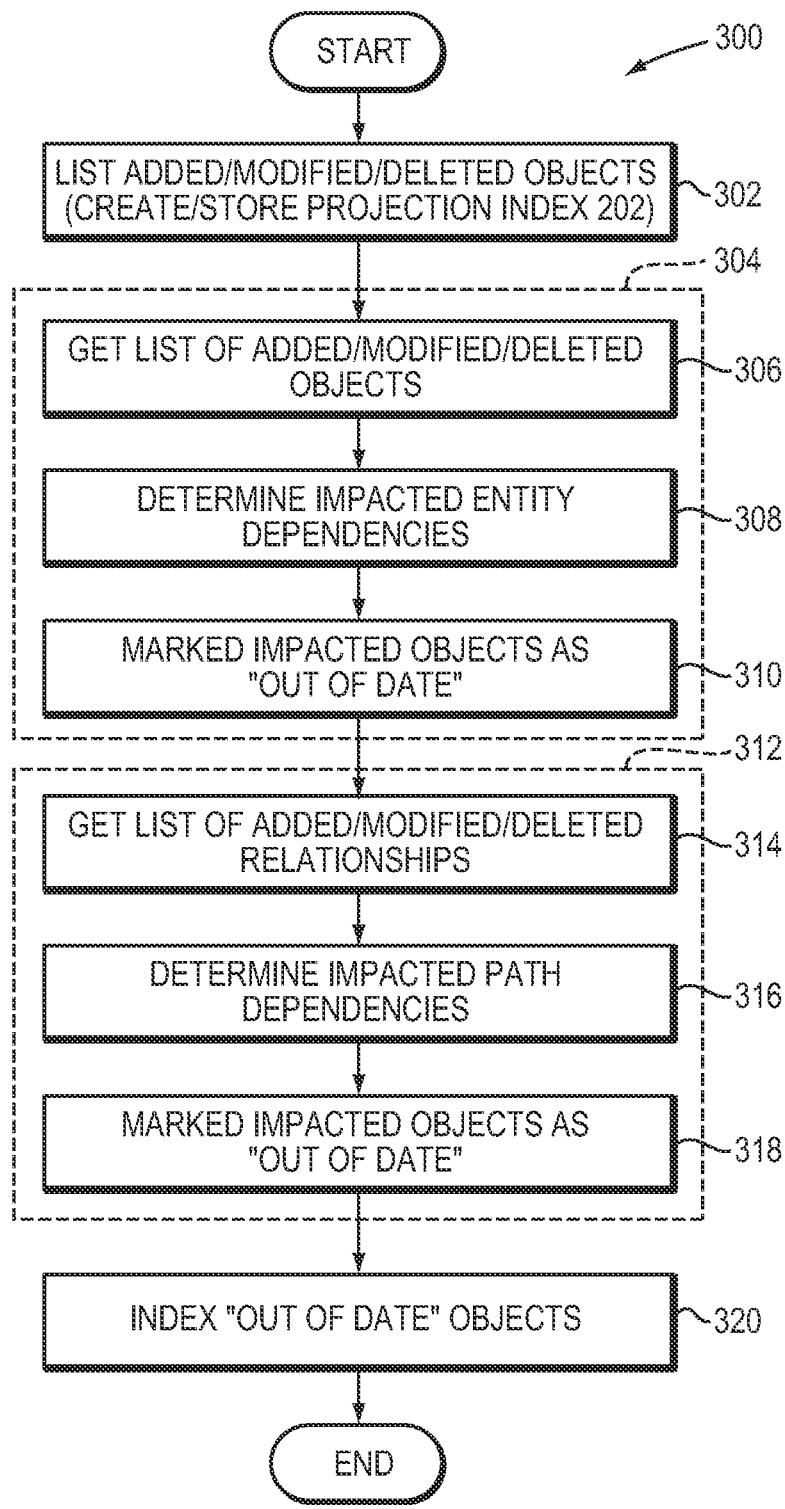
FIG. 3 is a flowchart that illustrates an exemplary computer-implemented method for use in maintaining currency of a projection index.

In the embodiments described herein, the term "database object" refers generally to any defined object in a database that is used to store, query, or reference data. Exemplary types of database objects include tables, views, clusters, sequences, indexes, stored procedures, and synonyms. The above examples are exemplary only and, thus, are not intended to limit in any way the definition and/or meaning of the term "database object."

Exemplary embodiments of systems, methods, apparatus, and computer program products for use in maintaining current database object values and/or paths are described herein. The embodiments described herein facilitate reducing stale data in a database by identifying two types of dependencies associated with projected data. The first type of dependency is entity dependence, wherein the data is stored as part of some database object such that changes to that database object may affect the projected value onto another database object. Entity dependencies identify a single database object, and are described using, for example, an object identifier. The second type of dependency is path dependence. When one or more relationships between two database objects are modified, then the projection may lead to a different set of entities. A path dependency can be described using, for example, an entity identifier, a relationship type, and a relationship direction.

FIG. 1 is a simple block diagram that illustrates entity dependency and path dependency between two database objects. Specifically, FIG. 1 shows a plurality of database objects 100 including a first database object (Obj1) 102, second database object (Obj2) 104, and a third database object (Obj3) 106 having a value of "foo." FIG. 1 also shows a plurality of relationships 108 between the database objects 100. Specifically, a first relationship (Rel1) 110 exists between the first database object 102 and the second database object 104, and a second relationship (Rel2) 112 exists between the second database object 104 and the third database object 106. Each relationship 108 is associated with a relationship type. For example, the first relationship 110 is associated with a relationship type REL1 and the second relationship 112 is associated with a relationship type REL2. Moreover, each relationship 108 is associated with a relationship direction, such as "to" or "from," that indicates the direction of dependency between the two related database objects.

In the example of FIG. 1, the first database object 102 is a dependent entity because any change to the third database object 106 may potentially change the projected value onto the first database object 102 and/or the second database object 104. Accordingly, an entity dependence 114 exists between the third database object 106 and at least the first database object 102. Moreover, a first path dependency 116 exists between the first database object 102 and the second database object 104. As noted above, the first path dependency 116 may be identified using an entity identifier, such as an identifier of the first database object 102, a relationship type, and a relationship direction, such as from the first database object 102 to the second database object 104. Accordingly, and as shown in FIG. 1, the first path dependency 116 may be identified as Obj1/REL1/from. Similarly, a second path dependency 118 exists between the second database object 104 and the third database object 106. As noted above, the second path dependency 118 may be identified using an entity identifier, such as an identifier of the second database object 104, a relationship type, and a relationship direction, such as from the third database object 106 to the second database object 104. Accordingly, and as shown in FIG. 1, the second path dependency 118 may be identified as Obj2/REL2/to.

Each of the database objects 100 and relationships 108 may contain metadata 120. When searching such metadata 120, it is often desirable to search for a particular database object 100, such as the third database object 106, with regard to a connected database object 100, such as the first database object 102. For example, a search may be constructed to determine all database objects 100 that are connected to another database object 100 where the other database object 100 has a given metadata value. Such searches can be performed against normalized data where the existing database object structure is retained such that the query traverses the connected database objects 100 to see if each matches the given criteria. In at least some known relational database systems, such as those with large datasets, this requires expensive memory and/or processing resources. Accordingly, embodiments of the invention "flatten" the database object structure. In such an approach, each database object 100 is stored in a different form wherein the metadata 120 of other connected database objects 100 are projected onto the original database object 100 as though the connected database objects 100 exist directly on the original database object 100. Such "projection" is frequently referred to as "flattening" the data. Moreover, such projection can be stored as an updatable index to facilitate faster and less resource-intensive searching.

FIG. 2 illustrates how a relational database can be flattened using projection. Specifically, FIG. 2 is a block diagram of a database 200, such as a relational database, that includes database objects 100 and relationships 108 between the database objects 100, as was described above. The right hand side of FIG. 2 is a block diagram representation of a projection index 202. Specifically, FIG. 2 illustrates how the metadata value 120 of one database object, such as the third database object 106, is projected onto another database object, such as the first database object 102.

FIG. 3 is a flowchart 300 that illustrates an exemplary computer-implemented method for use in maintaining currency of the projection index 202 (shown in FIG. 2) of for the database objects 100 (shown in FIG. 1). In an exemplary embodiment, the projection index 202 is created 302 to represent a connection between the first database object 102 and at least the second database object 104 (both shown in FIG. 1). As shown in FIG. 2, the projection index 202 may be created to represent a connection between the first database object 102 and the third database object 106 (shown in FIG. 1). The projection index 202 is stored in a memory area. Moreover, and as described in greater detail below, the projection index 202 may be updated to reflect modifications to the values of one or more database objects 100 and/or modifications to the relationships 108 between database objects 100.

In some embodiments, the projection index 202 is created by storing the database objects 100 in a memory area such that an entity dependency and/or a path dependency between the first database object 102 and at least the second database object 104 is stored in the memory area in association with the first database object 102.

In an exemplary embodiment, a computer processes 304 one or more entity dependencies between database objects 100, such as between the first database object 102 and another database object 100. For example, an entity dependency 114 is detected between the first database object 102 and the third database object 106. The computer determines 306 a list of modified or deleted database objects 100. Based on the projection index 202, the computer searches the memory area to determine 308 impacted entity dependencies when the second database object 104 and/or the third database object 106 have been modified or deleted. For example, based on the projection index 202, the computer determines whether the entity dependency 114 between the first database object 102 and the second database object 104 and/or the third database object 106 is impacted by modification of the second database object 104 and/or the third database object 106. In response to determining the impacted entity dependencies between the first database object 102 and the second database object 104 and/or the third database object 106, the computer indicates 310 in the memory area that the first database object 102 is noncurrent.

Moreover, the computer also processes 312 one or more path dependencies between database objects 100, such as between the first database object 102 and another database object 100. For example, a first path dependency 116 (shown in FIG. 1) is detected between the first database object 102 and the second database object 104 and a second path dependency 118 (shown in FIG. 1) is detected between the second database object 104 and the third database object 106. The computer determines 314 a list of modified or deleted relationships 108 between database objects 100. Based on the projection index 202, the computer searches the memory area to determine 316 impacted path dependencies when a relationship, such as the first path dependency 116 between the first database object 102 and the second database object 104 has been modified. Similarly, the computer detects that the second path dependency 118 between the second database object 104 and the third database object 106 has been modified. In response to determining the impacted path dependencies, the computer indicates 318 in the memory area that the first database object 102 is noncurrent.

In an exemplary embodiment, the computer indexes or updates 320 the projection index 202 in response to a detected modification of at least one of the entity dependency and the path dependency and when the first database object 102 is marked or indicated as noncurrent. For example, the computer updates 320 the projection index 202 by updating the first database object 102 to reflect the modification of the affected entity dependency and/or the affected path dependency.

Figure 4:
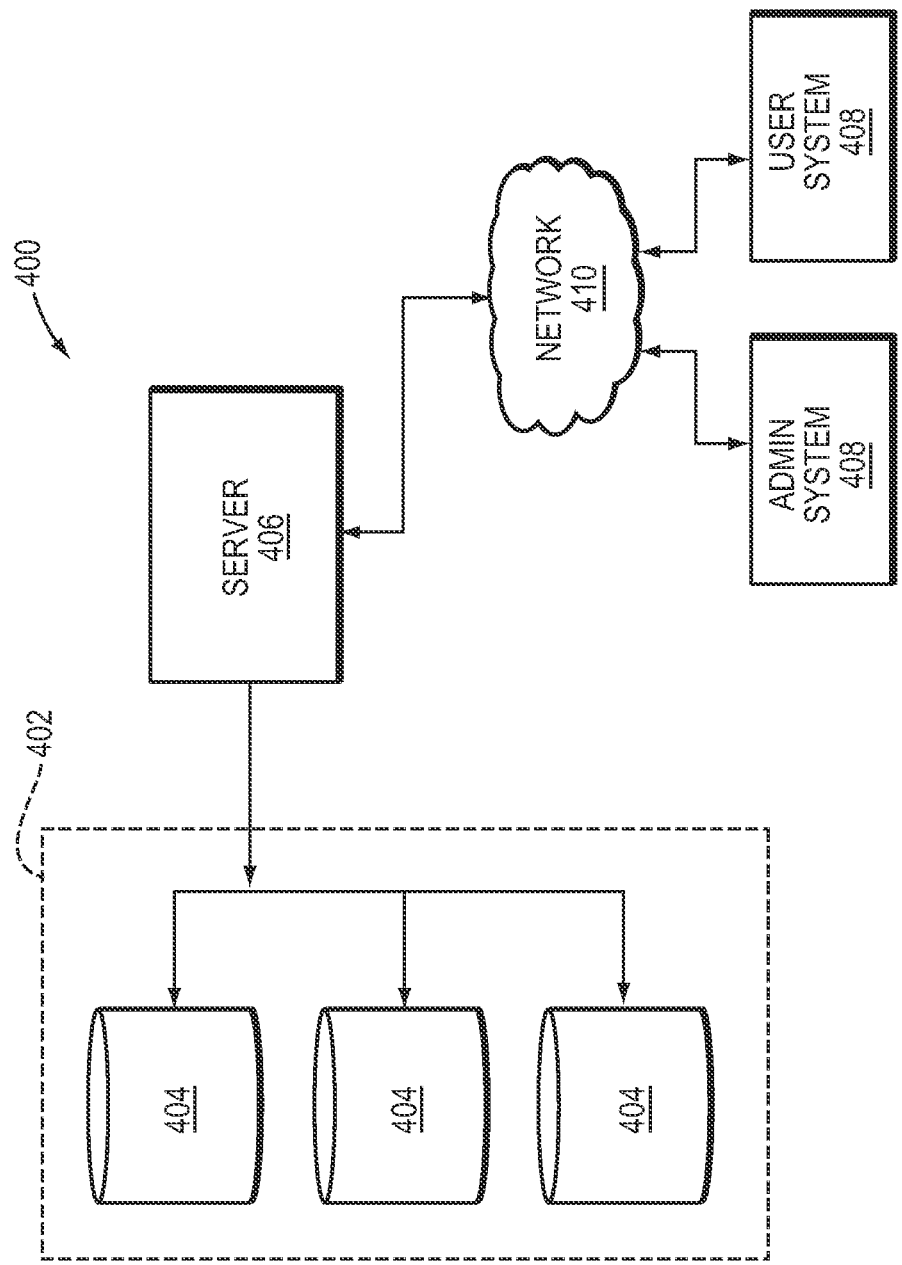
FIG. 4 is a schematic block diagram of an exemplary computer system.

FIG. 4 is a schematic block diagram of an exemplary computer system 400 for use in maintaining current database object values and/or paths and for use in performing the processes described above and/or additional processes that may be related to those described above. In an exemplary embodiment, a memory area 402 includes one or more storage devices 404 for use in storing data, such as metadata, database objects, relationships between database objects, entity dependencies between database objects, path dependencies between database objects, or any suitable information or data. In some embodiments, the memory area 402 is coupled to a server system 406, which is in turn coupled to client systems 408 such as an administrator system and/or a user system, via a network 410. The storage devices 404 may be embodied as one or more databases, may be located at a single or at multiple geographical sites, or may be integrated with the server system 406.

As can be appreciated, the network 410 can be a public network, such as the Internet, or a private network such as an LAN or WAN network, or any combination thereof and can also include PSTN or ISDN sub-networks. The network 410 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 410 is merely exemplary and in no way limits the scope of the present advancements.

As one of ordinary skill in the art would recognize, the client systems 408 can be any suitable computer system such as the one described below with reference to FIG. 5, or any other computing system that is known. Moreover, it should be understood that the server system 406 is configured to perform the processes described above and/or any additional processes that may be related to those described above.

The server system 406 stores the non-transitory, computer-readable instructions to execute the processes described above, and provides these instructions via the network 410 to the client systems 408. Moreover, the server system 406 can also provide data from the memory area 402 as needed to the client systems 408. As such, FIG. 4 includes implementations of the computer system 400 via cloud computing, distributed computing, and the like.

Figure 5:
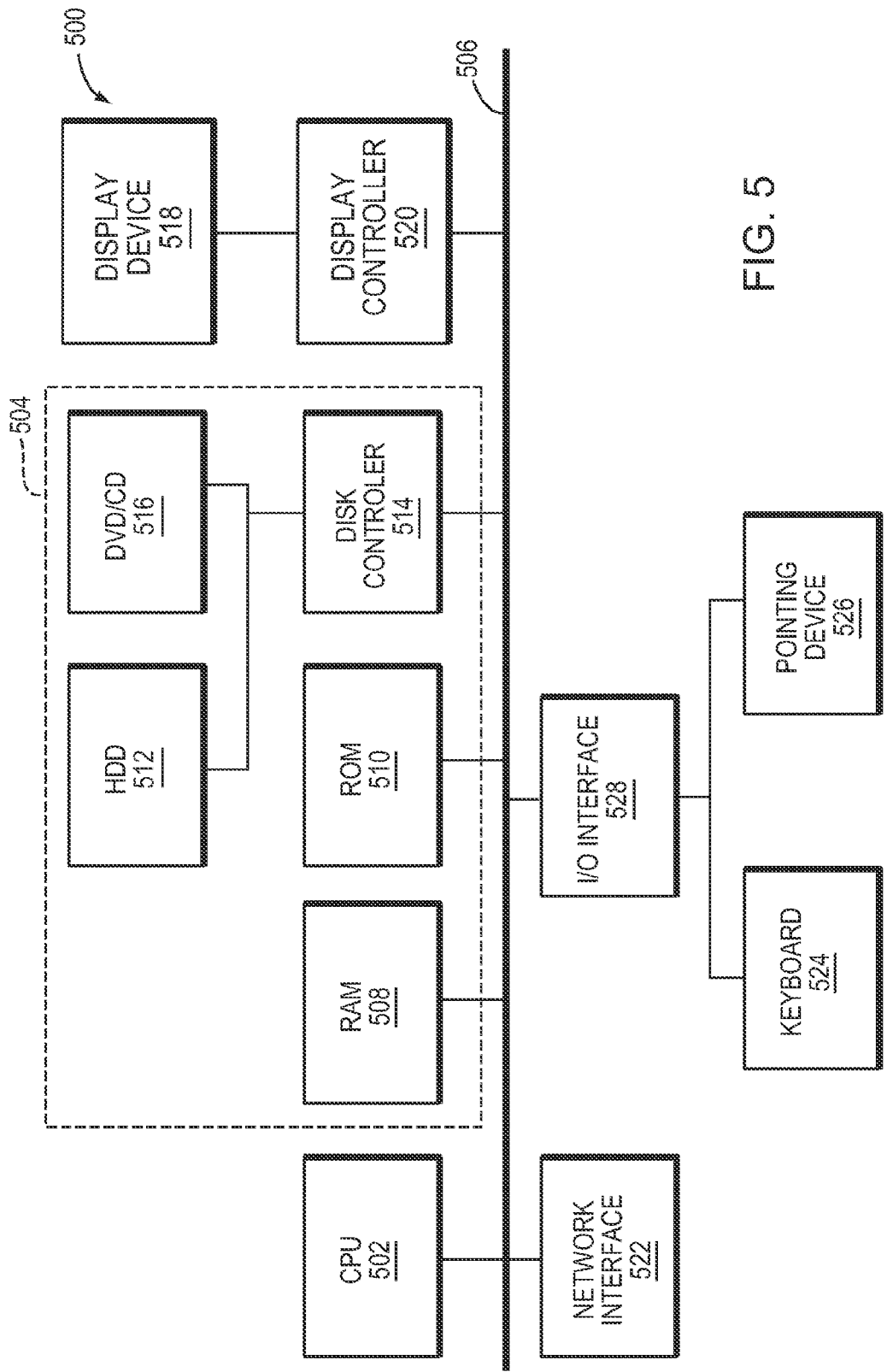
FIG. 5 is a schematic block diagram of an exemplary computer architecture for use with the computer system shown in FIG. 4.

FIG. 5 is a schematic block diagram of an exemplary computer architecture 500 for use with the server system 406 and/or the client systems 408 (each shown in FIG. 4).

In an exemplary embodiment, the computer architecture 500 includes one or more processors 502 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 504 that is operably and/or communicatively coupled to the processor 502 by a system bus 506. A "memory area," as used herein, refers generally to any means of storing program code and instructions executable by one or more processors to aid in maintaining current database object values and/or paths. The memory area 504 may include one, or more than one, forms of memory. For example, the memory area 504 may include random-access memory (RAM) 508, which can include non-volatile RAM, magnetic RAM, ferroelectric RAM, and/or other forms of RAM. The memory area 504 may also include read-only memory (ROM) 510 and/or flash memory and/or electrically-programmable read-only memory (EEPROM). Any other suitable magnetic, optical, and/or semiconductor memory, such as a hard-disk drive (HDD) 512, by itself or in combination with other forms of memory, may be included in the memory area 504. The HDD 512 may also be coupled to a disk controller 514 for use in transmitting and receiving messages to and from the processor 502. Moreover, the memory area 504 may also be, or may include, a detachable or removable memory 516, such as a suitable cartridge disk, CD-ROM, DVD, or USB memory. The above examples are exemplary only and, thus, are not intended to limit in any way the definition and/or meaning of the term "memory area."

Furthermore, in some embodiments, the memory area 504 includes a database. As used herein, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The computer architecture 500 also includes a display device 518 that is coupled, such as operatively coupled, to a display controller 520. The display controller 520 receives data via the system bus 506 for display by the display device 518. The display device 518 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 518 may include a touchscreen with an associated touchscreen controller. The above examples are exemplary only and, thus, are not intended to limit in any way the definition and/or meaning of the term "display device."

In addition, the computer architecture 500 includes a network interface 522 for use in communicating with a network (not shown in FIG. 5). Moreover, the computer architecture 500 includes one or more input devices, such as a keyboard 524 and/or a pointing device 526, such as a roller ball, mouse, touchpad, and the like. The input devices are coupled to and controlled by an input/output (I/O) interface 528, which is further coupled to the system bus 506.

A description of the general features and functionality of the display device 518, keyboard 524, pointing device 526, as well as the display controller 520, disk controller 514, network interface 522, and I/O interface 528 is omitted herein for brevity as these features are known.

FIGS. 6-11 are block diagrams illustrating various use cases of the embodiments described herein. More specifically, FIGS. 6-11 illustrate how the embodiments described herein can be used to resolve a number of problems that are unresolved by the prior art. In each of FIGS. 6-11, it is assumed that the projection index 202 has already been created. Moreover, each of the examples described below may be performed by the server system 406 or the client system 408 (both shown in FIG. 4). Furthermore, the original relationships between each database object shown in FIGS. 6-11 was described above with respect to FIG. 1. It should be understood that this is not an exhaustive set of situations in which the embodiments described herein may be use. They are simply illustrative to distinguish the described embodiments from known systems and methods.

Figure 6:
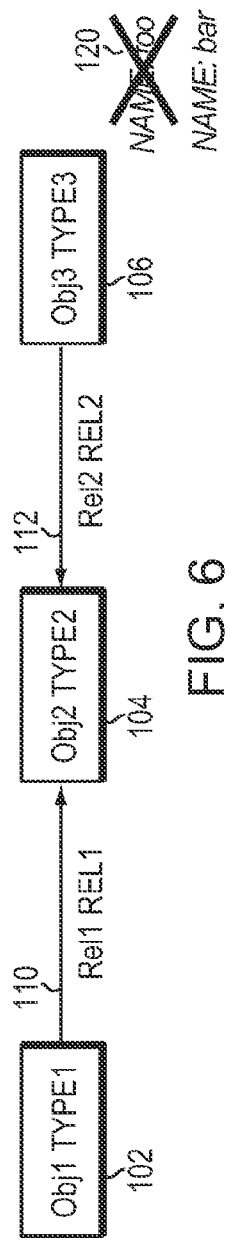

FIG. 6 illustrates how the embodiments described above enable updating the first database object 102 when the metadata value of the third database object 106 is modified. First, a list of modified or deleted database objects 100 is generated. As shown in FIG. 6, a value 120 of the third database object 106 has been changed from "foo" to "bar." A list of database objects 100 is then generated, including database objects 100 having entity dependence on the third database object 106. As explained above, the first database object 102 has an entity dependency 114 of the third database object 106 because any change to the third database object 106 may potentially change the projected value onto the first database object 102. Accordingly, the first database object 102 is marked as an impacted object (i.e., it is marked as "out of date" or noncurrent).

Next, a list of modified or deleted relationships 108 is generated. Because there are no modified or deleted relationships 108 in this scenario, there are no database objects 100 to be marked as "out of date" or noncurrent for reasons of impacted relationship/path dependencies.

The marked object is then indexed to reflect the modification. For example, the projection index 202 will be recreated such that projection of the third database object 106 value is projected onto the first database object 102.

Figure 7:
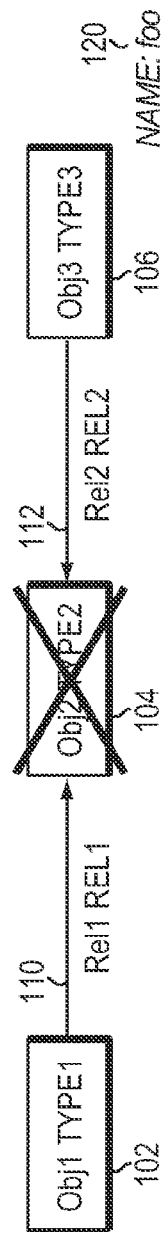

FIG. 7 illustrates how the embodiments described above enable updating the first database object 102 when an intermediate database object 100 is deleted. First, a list of modified or deleted database objects 100 is generated. As shown in FIG. 7, the second database object 104 has been deleted. A list of database objects 100 is then generated, including database objects 100 on which the second database object 104 has entity dependence. Because there are no such database objects 100 in this scenario, there are no database objects 100 to be marked as "out of date" or noncurrent.

Next, a list of modified or deleted relationships 108 is generated. As shown in FIG. 7, a first relationship 110 exists between the first database object 102 and the second database object 104 and a second relationship 112 exists between the second database object 104 and the third database object 106. Deletion of the second database object 104 results in also deleting the first and second relationships 110 and 112. The impacted path dependencies are then determined from the list of modified or deleted relationships 108. In this case, deleting the first relationship 110 impacts the path dependency between the first database object 102 and the second database object 104. Similarly, deleting the second relationship 112 impacts the path dependency between the second database object 104 and the third database object 106. Accordingly, the first database object 102 is marked as an impacted object (i.e., it is marked as "out of date" or noncurrent). The marked object is then indexed to reflect the modification. For example, the projection index 202 will be recreated such that projection of the third database object 106 value is projected onto the first database object 102 without the path dependencies.

Figure 8:
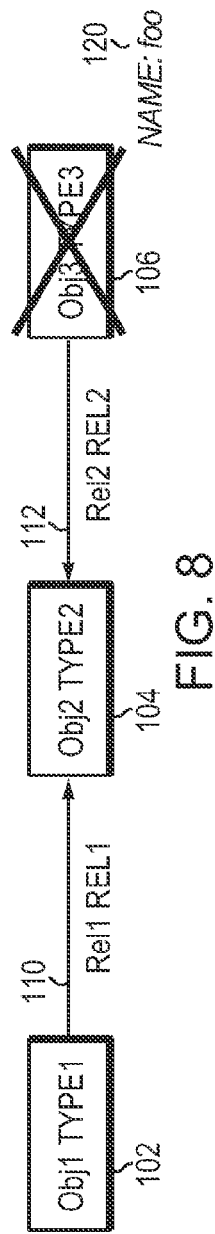

FIG. 8 illustrates how the embodiments described above enable updating the first database object 102 when a leaf database object 100 is deleted. First, a list of modified or deleted database objects 100 is generated. As shown in FIG. 8, the third database object 106 has been deleted. A list of database objects 100 is then generated, including database objects 100 having entity dependence on the third database object 106. As explained above, the first database object 102 has an entity dependency 114 of the third database object 106 because deletion of the third database object 106 changes the projected value onto the first database object 102. Accordingly, the first database object 102 is marked as an impacted object (i.e., it marked as "out of date" or noncurrent).

Next, a list of modified or deleted relationships 108 is generated. Because there are no modified or deleted relationships 108 in this scenario, there are no database objects 100 to be marked as "out of date" or noncurrent.

The marked object is then indexed to reflect the deletion. For example, the projection index 202 will be recreated such that the third database object 106 value is no longer projected onto the first database object 102.

Figure 9:
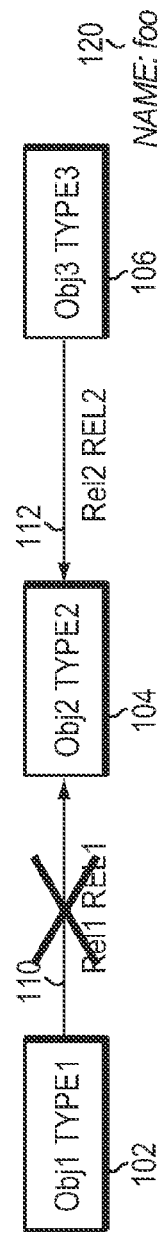

FIG. 9 illustrates how the embodiments described above enable updating the first database object 102 when an intermediate relationship 108 is deleted or when an intermediate database object 100 is disconnected. First, a list of modified or deleted database objects 100 is generated. As shown in FIG. 9, the first relationship 110 between the first database object 102 and the second database object 104 has been deleted. A list of database objects 100 is then generated, including database objects 100 on which the second database object 104 has entity dependence. Because there are no such database objects 100 in this scenario, there are no database objects 100 to be marked as "out of date" or noncurrent.

Next, a list of modified or deleted relationships 108 is generated. As shown in FIG. 9, the first relationship 110 between the first database object 102 and the second database object 104 has been deleted. The impacted path dependencies are then determined from the list of modified or deleted relationships 108. In this case, deleting the first relationship 110 impacts the path dependency between the first database object 102 and the second database object 104. Accordingly, the first database object 102 is marked as an impacted object (i.e., it is marked as "out of date" or noncurrent). The marked object is then indexed to reflect the modification. For example, the projection index 202 will be recreated such that the third database object 106 value is no longer projected onto the first database object 102.

Figure 10:
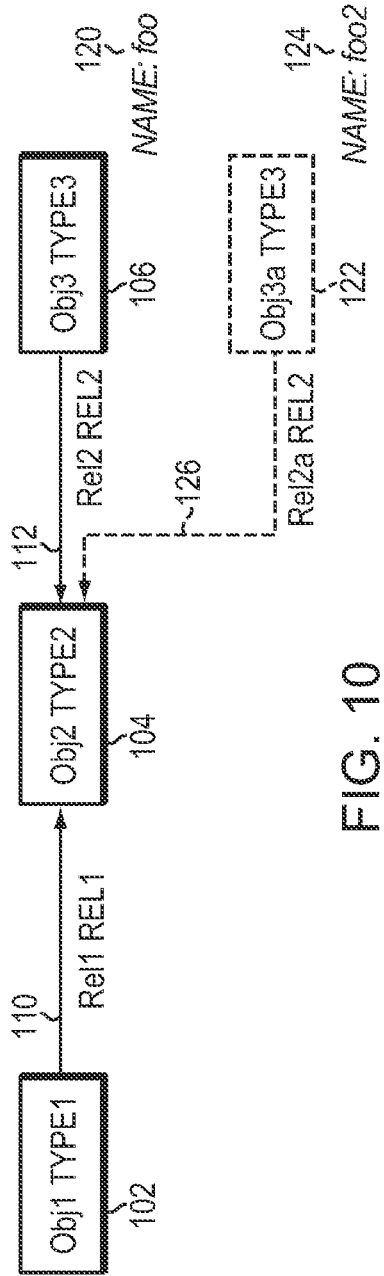

FIG. 10 illustrates how the embodiments described above enable addition of a new leaf database object 100. First, a list of modified (e.g., added) database objects 100 is generated. As shown in FIG. 10, a fourth database object (Obj3a) 122 has been added, having a metadata value 124 of "foo2." FIG. 10 also shows a third relationship (rel2a) 126 between the fourth database object 122 and the second database object 104. As described above, each relationship 108 is associated with a relationship type. Here, the third relationship 126 is associated with a relationship type REL2. With the addition of the fourth database object 122, a third path dependency exists between the second database object 104 and the fourth database object 122. As noted above, the third path dependency may be identified using an entity identifier, such as an identifier of the second database object 104, a relationship type, and a relationship direction, such as from the fourth database object 122 to the second database object 104. Accordingly, the third path dependency may be identified as Obj2/REL2/to.

Next, a list of database objects 100 is then generated, including database objects 100 on which the fourth database object 122 has entity dependence. Because there are no such database objects 100 in this scenario, there are no database objects 100 to be marked as "out of date" or noncurrent.

Then a list of modified or deleted relationships 108 is generated. As shown in FIG. 10, the third relationship 126 between the second database object 104 and the fourth database object 122 has been added. The impacted path dependencies are then determined from the list of modified or deleted relationships 108. In this case, adding the third relationship 126 impacts the path dependency between the first database object 102 and the second database object 104. Accordingly, the first database object 102 is marked as an impacted object (i.e., it is marked as "out of date" or noncurrent). The marked object is then indexed to reflect the modification. For example, the projection index 202 will be recreated such that the fourth database object 122 value is now projected onto the first database object 102.

Figure 11:
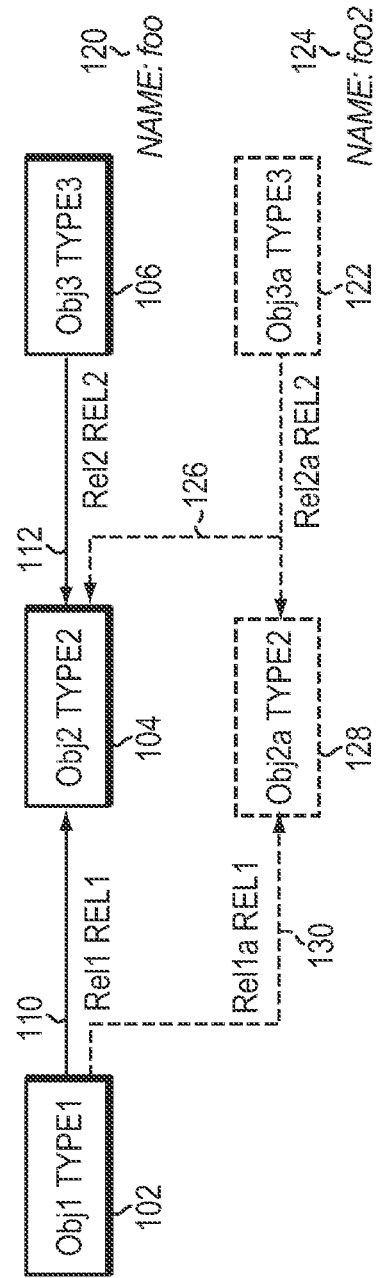

FIG. 11 illustrates how the embodiments described above enable addition of a new leaf database object 100 and a new intermediate database object 100. First, a list of modified (e.g., added) database objects 100 is generated. As shown in FIG. 11, a fourth database object (Obj3*a*) 122 has been added, having a metadata value 124 of "foo2." FIG. 11 also shows a third relationship (rel2*a*) 126 between the fourth database object 122 and the second database object 104. As described above, each relationship 108 is associated with a relationship type. Here, the third relationship 126 is associated with a relationship type REL2. With the addition of the fourth database object 122, a third path dependency exists between the second database object 104 and the fourth database object 122. As noted above, the third path dependency may be identified using an entity identifier, such as an identifier of the second database object 104, a relationship type, and a relationship direction, such as from the fourth database object 122 to the second database object 104. Accordingly, the third path dependency may be identified as Obj2/REL2/to.

FIG. 11 also shows a fifth database object (Obj2*a*) 128 that has been added. A fourth relationship (rel1*a*) 130 exists between the first database object 102 and the fifth database object 128. As described above, each relationship 108 is associated with a relationship type. Here, the fourth relationship 130 is associated with a relationship type REL1. With the addition of the fifth database object 128, a fourth path dependency exists between the first database object 102 and the fifth database object 128. The fourth path dependency may be identified using an entity identifier, such as an identifier of the first database object 102, a relationship type, and a relationship direction, such as from the first database object 102 to the fifth database object 128. Accordingly, the fourth path dependency may be identified as Obj1/REL1/from.

Next, a list of database objects 100 is then generated, including database objects 100 on which the fifth database object 128 has entity dependence. Because there are no such database objects 100 in this scenario, there are no database objects 100 to be marked as "out of date" or noncurrent.

Then a list of modified or deleted relationships 108 is generated. As shown in FIG. 11, the fourth relationship 130 between the first database object 102 and the fifth database object 128 has been added. The impacted path dependencies are then determined from the list of modified or deleted relationships 108. In this case, adding the fourth relationship 130 creates the fourth path dependency between the first database object 102 and the fifth database object 128. Moreover, the third relationship 126 between the second database object 104 and the fourth database object 122 has been added. Adding the third relationship 126 impacts the path dependency between the first database object 102 and the second database object 104. Accordingly, the first database object 102 is marked as an impacted object (i.e., it is marked as "out of date" or noncurrent). The marked object is then indexed to reflect the modification. For example, the projection index 202 will be recreated such that the fourth and fifth database objects 122 and 128 are now projected onto the first database object 102.

FIG. 12 illustrates how the embodiments described above enable addition of a first new leaf database object 100. More specifically, FIG. 12 illustrates how the embodiments described above enable addition of the first new leaf database object when the second database object 104 initially has no relationships connecting the second database object 104 to another database object 100. In other words, FIG. 12 illustrates how initial relationships are made to the second database object 104 from a newly added leaf database object. First, a list of modified (e.g., added) database objects 100 is generated. As shown in FIG. 12, a sixth database object (Obj3*a*) 132 has been added, having a metadata value 134 of "foo2." FIG. 12 also shows a fifth relationship (rel2*a*) 136 between the sixth database object 132 and the second database object 104. As described above, each relationship 108 is associated with a relationship type. Here, the fifth relationship 136 is associated with a relationship type REL2. With the addition of the sixth database object 132, a fifth path dependency exists between the second database object 104 and the sixth database object 132. As noted above, the fifth path dependency may be identified using an entity identifier, such as an identifier of the second database object 104, a relationship type, and a relationship direction, such as from the sixth database object 132 to the second database object 104. Accordingly, the fifth path dependency may be identified as Obj2/REL2/to.

Next, a list of database objects 100 is then generated, including database objects 100 on which the sixth database object 132 has entity dependence. Because there are no such database objects 100 in this scenario, there are no database objects 100 to be marked as "out of date" or noncurrent.

Then a list of modified or deleted relationships 108 is generated. As shown in FIG. 12, the fifth relationship 136 between the second database object 104 and the sixth database object 132 has been added. The impacted path dependencies are then determined from the list of modified or deleted relationships 108. In this case, adding the fifth relationship 136 impacts the path dependency between the first database object 102 and the second database object 104. Accordingly, the first database object 102 is marked as an impacted object (i.e., it is marked as "out of date" or noncurrent). The marked object is then indexed to reflect the modification. For example, the projection index 202 will be recreated such that the sixth database object 132 value is now projected onto the first database object 102.

FIG. 13 illustrates how the embodiments described above enable addition of a first new leaf database object 100 and a first new intermediate database object 100. More specifically, FIG. 13 illustrates how the embodiments described above enable addition of the first new leaf database object and the first new intermediate database object when the first database object 102 initially has no relationships connecting the first database object 102 to another database object 100. In other words, FIG. 13 illustrates how initial relationships are made to the first database object 102 from newly added leaf and intermediate database objects. First, a list of modified (e.g., added) database objects 100 is generated. As shown in FIG. 13, a seventh database object (Obj2*a*) 138 has been added as an intermediate database object 100. A sixth relationship (rel1*a*) 140 exists between the first database object 102 and the seventh database object 138. As described above, each relationship 108 is associated with a relationship type. Here, the sixth relationship 140 is associated with a relationship type REL1. With the addition of the seventh database object 138, a sixth path dependency exists between the first database object 102 and the seventh database object 138. The sixth path dependency may be identified using an entity identifier, such as an identifier of the first database object 102, a relationship type, and a relationship direction, such as from the first database object 102 to the seventh database object 138. Accordingly, the sixth path dependency may be identified as Obj1/REL1/from.

FIG. 13 also shows an eighth database object (Obj3*a*) 142 has been added, having a metadata value 144 of "foo2." FIG. 13 also shows a seventh relationship (rel2*a*) 146 between the seventh database object 138 and the eighth database object 142. As described above, each relationship 108 is associated with a relationship type. Here, the seventh relationship 146 is associated with a relationship type REL2.

Next, a list of database objects 100 is then generated, including database objects 100 on which the seventh and eighth database objects 138 and 142 have entity dependence. Because there are no such database objects 100 in this scenario, there are no database objects 100 to be marked as "out of date" or noncurrent.

Then a list of modified, deleted, or added relationships 108 is generated. As shown in FIG. 13, the sixth relationship 140 between the first database object 102 and the seventh database object 138 and the seventh relationship 146 between the seventh database object 138 and the eighth database object 142 have been added. The impacted path dependencies are then determined from the list of modified or deleted relationships 108. In this case, adding the sixth and seventh relationships 140 and 146 creates the sixth path dependency between the first database object 102 and the seventh database object 138. Accordingly, the first database object 102 is marked as an impacted object (i.e., it is marked as "out of date" or noncurrent). The marked object is then indexed to reflect the modification. For example, the projection index 202 will be recreated such that the seventh and eighth database objects 138 and 142 are now projected onto the first database object 102.

Exemplary embodiments of systems, methods, apparatus, and computer program products for use in maintaining current database object values and/or paths are described above in detail. The systems, methods, apparatus, and computer program products are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, such as those described herein, includes at least one processor or processing unit and a system memory. The computer typically has at least some form of computer readable media. By way of example and not limitation, computer readable media include computer storage media and communication media. Computer storage media include non-transitory, volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

Exemplary technical effects of the systems, methods, apparatus, and computer program products described herein include at least one of: (a) creating a projection index representative of a connection between a first database object and at least a second database object; (b) determining an entity dependency between the first database object and at least the second database object; (c) determining a path dependency between the first database object and at least the second database object; and (d) updating the projection index in response to a modification of one or both of the entity dependency and the path dependency.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for use in maintaining consistency among a plurality of database objects within a database, said computer-implemented method comprising:
   projecting the database into a data collection, the data collection being representative of a connection between a first database object of the plurality of database objects and at least a second database object of the plurality of database objects, wherein projecting the database into the data collection comprises:
      storing the data collection in a different and flattened format than format of the plurality of database objects, and
      representing the data collection as having at least the second database object existing directly on the first database object, said storing further stores the data collection such that the stored data collection serves as a projection index;
   determining an entity dependency between the first database object and at least the second database object, wherein the entity dependency includes at least a database object identifier;
   determining a path dependency between the first database object and at least the second database object, wherein the path dependency includes at least an entity identifier, a relationship type, and a relationship direction; and
   automatically updating one of the first database object and the second database object corresponding to representations by the data collection in response to a modification of at least one of the entity dependency and the path dependency.

2. The computer-implemented method of claim 1, wherein projecting the database into the data collection comprises storing the plurality of database objects in a memory area such that at least one of the entity dependency and the path dependency between the first database object and at least the second database object is stored in association with the first database object.

3. The computer-implemented method of claim 1, wherein determining an entity dependency comprises detecting that the second database object has been modified.

4. The computer-implemented method of claim 3, wherein determining an entity dependency further comprises determining, based on the projection index, whether the entity dependency between the first database object and the second database object is impacted by the modification of the second database object.

5. The computer-implemented method of claim 4, further comprising, in response to determining that the entity dependency between the first database object and the second database object is impacted by the modification of the second database object, indicating in a memory area that the first database object is noncurrent.

6. The computer-implemented method of claim 1, wherein determining a path dependency comprises detecting that a relationship between the first database object and the second database object has been modified.

7. The computer-implemented method of claim 6, wherein determining a path dependency further comprises determining, based on the projection index, whether the path dependency between the first database object and the second database object is impacted by the modification of the relationship between the first database object and the second database object.

8. The computer-implemented method of claim 7, further comprising, in response to determining that the path dependency between the first database object and the second database object is impacted by the modification of the relationship between the first database object and the second database object, indicating in a memory area that the first database object is noncurrent.

9. The computer-implemented method of claim 1, wherein automatically updating corresponding representations by the data collection comprises automatically updating the first database object to reflect the modification of at least one of the entity dependency and the path dependency.

10. The computer-implemented method of claim 1, further comprising the data collection being representative of an indirect connection between the first database and at least a third database object of the plurality of database objects.

11. A computer system comprising:
   (a) a memory area configured to:
      store a plurality of database objects within a database including at least a first database object and a second database object connected by an entity dependency and a path dependency;
      project the database into a data collection; and
      store the data collection such that a relationship between the first database object and at least the second database object is stored in association with the first database object in the data collection, wherein the memory area:
         stores the data collection in a different and flattened format than format of the plurality of database objects, and
         represents the data collection as having at least the second database object existing directly on the first database object,
      such that the stored data collection serves as a projection index; and
   (b) a processor operatively coupled to said memory area, said processor configured to:
      determine an entity dependency between the first database object and at least the second database object, wherein the entity dependency includes at least a database object identifier;
      determine a path dependency between the first database object and at least the second database object, wherein the path dependency includes at least an entity identifier, a relationship type, and a relationship direction; and automatically update one of the first database object and the second database object corresponding to stored associations in the data collection in response to a modification of at least one of the entity dependency and the path dependency.

12. The computer system of claim 11, wherein said processor is further configured to detect that the second database object has been modified.

13. The computer system of claim 12, wherein said processor is further configured to determine, based on the projection index, whether the entity dependency between the first database object and the second database object is impacted by the modification of the second database object.

14. The computer system of claim 13, wherein said processor is further configured to, in response to determining that the entity dependency between the first database object and the second database object is impacted by the modification of the second database object, indicate in said memory area that the first database object is noncurrent.

15. The computer system of claim 11, wherein said processor is further configured to detect that a relationship between the first database object and the second database object has been modified.

16. The computer system of claim 15, wherein said processor is further configured to determine, based on the projection index, whether the path dependency between the first database object and the second database object is impacted by the modification of the relationship between the first database object and the second database object.

17. The computer system of claim 16, wherein said processor is further configured to, in response to determining that the path dependency between the first database object and the second database object is impacted by the modification of the relationship between the first database object and the second database object, indicate in said memory area that the first database object is noncurrent.

18. The computer system of claim 11, wherein said processor is further configured to automatically update the first database object to reflect the modification of at least one of the entity dependency and the path dependency.

19. The computer system of claim 11, wherein the plurality of database objects within the database further includes at least a third database object wherein at least the first database object and the third database object are indirectly connected by an entity dependency and a path dependency.

20. A computer program product for use in maintaining consistency among a plurality of database objects within a database, said computer program product comprising one or more computer-readable storage media having computer-executable components, said components comprising:

an indexing component that when executed by at least one processor causes the at least one processor to:

store in a memory area the plurality of database objects including at least a first database object and a second database object connected by an entity dependency and a path dependency; and store in the memory area a data collection of the plurality of database objects such that a relationship between the first database object and at least the second database object is stored in association with the first database object in the data collection, wherein the indexing component:

stores the data collection in a different and flattened format than format of the plurality of database objects, and represents the data collection as having at least the second database object existing directly on the first database object, such that the stored data collection serves as a projection index; and an entity dependency component that when executed by at least one processor causes the at least one processor to determine an entity dependency between the first database object and at least the second database object, wherein the entity dependency includes at least a database object identifier; and a path dependency component that when executed by at least one processor causes the at least one processor to determine a path dependency between the first database object and at least the second database object, wherein the path dependency includes at least an entity identifier, a relationship type, and a relationship direction, and wherein said indexing component further causes the at least one processor to automatically update a stored association in the data collection and the first database object in response to a modification of at least one of the entity dependency and the path dependency.

21. The computer program product of claim 20, wherein said entity dependency component further causes the at least one processor to detect that the second database object has been modified.

22. The computer program product of claim 21, wherein said entity dependency component further causes the at least one processor to determine, based on the projection index, whether the entity dependency between the first database object and the second database object is impacted by the modification of the second database object.

23. The computer program product of claim 22, wherein said entity dependency component further causes the at least one processor to, in response to determining that the entity dependency between the first database object and the second database object is impacted by the modification of the second database object, indicate in a memory area that the first database object is noncurrent.

24. The computer program product of claim 20, wherein said path dependency component further causes the at least one processor to detect that a relationship between the first database object and the second database object has been modified.

25. The computer program product of claim 24, wherein said path dependency component further causes the at least one processor to determine, based on the projection index, whether the path dependency between the first database object and the second database object is impacted by the modification of the relationship between the first database object and the second database object.

26. The computer program product of claim 25, wherein said path dependency component further causes the at least one processor to, in response to determining that the path dependency between the first database object and the second database object is impacted by the modification of the relationship between the first database object and the second database object, indicate in a memory area that the first database object is noncurrent.

27. The computer program product of claim 20, wherein the plurality of database objects within the database further includes at least a third database object wherein at least the first database object and the third database object are indirectly connected by an entity dependency and a path dependency.

\* \* \* \* \*